(12) United States Patent  
Yoshida et al.

(10) Patent No.: US 9,598,553 B2
(45) Date of Patent: Mar. 21, 2017

(54) METAL NANOPARTICLE COMPOSITE AND METHOD FOR PRODUCING THE SAME

(75) Inventors: Norihiro Yoshida, Ichihara (JP); Takao Nishiura, Chuo-ku (JP)

(73) Assignee: MARUZEN PETROCHEMICAL CO., LTD., Tokyo (JP)

(*) Notice: Subject to any disclaimer, the term of this patent is extended or adjusted under 35 U.S.C. 154(b) by 480 days.

(21) Appl. No.: 13/981,620

(22) PCT Filed: Jan. 25, 2012

(86) PCT No.: PCT/JP2012/051497
§ 371 (c)(1),
(2), (4) Date: Jul. 25, 2013

(87) PCT Pub. No.: WO2012/102286
PCT Pub. Date: Aug. 2, 2012

(65) Prior Publication Data
US 2014/0058028 A1 Feb. 27, 2014

(30) Foreign Application Priority Data
Jan. 26, 2011 (JP) .................................. 2011-014407

(51) Int. Cl.
*B01J 31/06* (2006.01)
*C08F 297/02* (2006.01)
(Continued)

(52) U.S. Cl.
CPC ............... *C08K 3/08* (2013.01); *B22F 1/0018* (2013.01); *B22F 1/0062* (2013.01); *B22F 9/24* (2013.01);
(Continued)

(58) Field of Classification Search
USPC ........................................................ 524/379
See application file for complete search history.

(56) References Cited

U.S. PATENT DOCUMENTS

2007/0134491 A1 6/2007 Atsuki et al.
2008/0114128 A1 5/2008 Destarac et al.
(Continued)

FOREIGN PATENT DOCUMENTS

CN 1497020 A 5/2004
CN 1735633 A 2/2006
(Continued)

OTHER PUBLICATIONS

Combined Office Action and Search Report issued May 25, 2015 in Taiwanese Patent Application No. 101102738 (with English translation of Category of Cited Documents).

*Primary Examiner* — Ling Choi
*Assistant Examiner* — Thuy-Ai N Nguyen
(74) *Attorney, Agent, or Firm* — Oblon, McClelland, Maier & Neustadt, L.L.P.

(57) ABSTRACT

Provided are a metal nanoparticle composite which exhibits excellent stability over time and retention stability and is useful as a raw material for a metal nanoparticle-dispersed film, a method for producing the composite, a metal nanoparticle dispersion liquid, a composition for forming a metal nanoparticle-dispersed film, and a metal nanoparticle-dispersed film. Disclosed is a metal nanoparticle composite comprising (A) a star-shaped polymer having a central core and arms bonded to the central core, the arms comprising a repeating unit represented by the following formula (1) and a repeating unit represented by the following formula (2); and (B) metal nanoparticles supported thereon: wherein in the formula (1), $R^1$ represents a hydrogen atom or an alkyl group having 1 to 4 carbon atoms; and in the formula (2), $R^2$ represents a methyl group or an ethyl group; and k represents an integer from 1 to 10.

(Continued)

(51) Int. Cl.

| | | |
|---|---|---|
| C08F 297/04 | (2006.01) | |
| C08F 290/06 | (2006.01) | |
| C08F 290/14 | (2006.01) | |
| C08K 3/08 | (2006.01) | |
| B22F 1/00 | (2006.01) | |
| B22F 9/24 | (2006.01) | |
| C08L 53/00 | (2006.01) | |
| C08K 5/05 | (2006.01) | |
| C08L 29/10 | (2006.01) | |
| B82Y 30/00 | (2011.01) | |
| C08F 297/00 | (2006.01) | |

(52) U.S. Cl.
CPC ............ *B82Y 30/00* (2013.01); *C08F 297/00* (2013.01); *C08K 5/05* (2013.01); *C08L 29/10* (2013.01); *C08L 53/00* (2013.01)

(56) References Cited

U.S. PATENT DOCUMENTS

| | | |
|---|---|---|
| 2009/0031856 A1 | 2/2009 | Lee et al. |
| 2009/0099301 A1 | 4/2009 | Naraghi et al. |
| 2009/0149583 A1 | 6/2009 | Lin et al. |
| 2012/0022219 A1 | 1/2012 | Yoshida |
| 2012/0172535 A1 | 7/2012 | Yoshida |

FOREIGN PATENT DOCUMENTS

| | | |
|---|---|---|
| JP | 11 80647 | 3/1999 |
| JP | 2005 81501 | 3/2005 |
| JP | 2005-154497 A | 6/2005 |
| JP | 2006 37145 | 2/2006 |
| JP | 2007 146279 | 6/2007 |
| JP | 2009 30170 | 2/2009 |
| JP | 2009 62570 | 3/2009 |
| TW | 200722207 A | 6/2007 |
| TW | 201040202 A1 | 11/2010 |
| WO | 2008 056431 | 5/2008 |
| WO | 2010 109928 | 9/2010 |

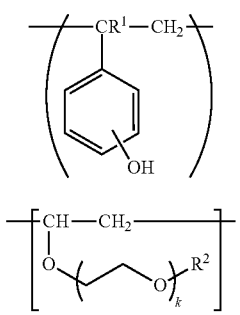

(1)

(2)

19 Claims, 2 Drawing Sheets

METAL NANOPARTICLE COMPOSITE AND METHOD FOR PRODUCING THE SAME

CROSS REFERENCE TO RELATED APPLICATIONS

The present application is a 35 U.S.C. §371 national stage patent application of international patent application PCT/JP2012/051497, filed on Jan. 25, 2012, published as WO 2012/102286 on Aug. 2, 2012, the text of which is incorporated by reference, and claims the benefit of the filing date of Japanese Patent Application No. 2011-014407, filed on Jan. 26, 2011, the text of which is also incorporated by reference.

TECHNICAL FIELD

The present invention relates to a metal nanoparticle composite, a method for producing the same, a metal nanoparticle dispersion liquid, a composition for forming a metal nanoparticle-dispersed film, and a metal nanoparticle-dispersed film.

BACKGROUND ART

Metal nanoparticles such as gold nanoparticles have unique properties that are absent in bulk materials, and therefore, metal nanoparticles are utilized in a variety of fields including colored materials, fluorescent materials, polarizing materials, nanocrystalline materials, electroconductive materials, and the like.

Methods for producing the metal nanoparticles are roughly classified into dry methods and wet methods, and examples of the dry methods include a deposition method. However, special apparatuses are required in this method.

On the contrary, according to wet methods, metal nanoparticles can be obtained by simple operations, and as a representative method, a method of obtaining metal nanoparticles by causing a protective agent and a metal ion to co-exist in a liquid phase and adding a reducing agent thereto, is known. According to this method, the metal nanoparticles are supported on the protective agent, and a metal nanoparticle composite is formed. Therefore, aggregation of metal nanoparticles in a liquid is prevented.

Further, in recent years, there is a demand for an enhancement of the stability of a composite in a liquid, and an increase in the concentration of metal nanoparticles in a metal nanoparticle dispersion liquid containing this composite, from the viewpoint of increasing the usefulness of the composite when the composite is utilized in the colored materials and the like described above. Furthermore, an improvement is desired for the dispersibility in the case where a resin, a crosslinkable compound or the like has been incorporated into such a dispersion liquid, or in the case where this dispersion liquid is used to form a dispersed film.

Also, in order to contribute to these demands, technologies for reducing excess protective agent or reducing agent, or ionic impurities present in the dispersion liquid are known. Regarding such technologies, various methods for purifying dispersion liquids have been suggested, such as electrodialysis (Patent Literature 1); a method of replacing the solvent by ultrafiltration using water (Patent Literature 2); a method of adding a dispersibility lowering agent to a water-soluble dispersion liquid, subsequently settling metal nanoparticles by centrifugation, and removing the dispersing medium (Patent Literature 3); a method of washing a non-water-soluble dispersion liquid with a large amount of deionized water (Patent Literature 4); and a method of adding a large amount of a poor solvent to a non-water-soluble dispersion liquid to settle aggregates, and then separating the aggregates by decantation or centrifugation (Patent Literatures 5 and 6).

CITATION LIST

Patent Literature

Patent Literature 1: JP 11-80647 A
Patent Literature 2: JP 2007-146279 A
Patent Literature 3: JP 2009-62570 A
Patent Literature 4: JP 2005-81501 A
Patent Literature 5: JP 2006-37145 A
Patent Literature 6: JP 2009-30170 A
Patent Literature 7: WO 08/056,431 A

SUMMARY OF INVENTION

Technical Problem

However, in the electrodialysis or ultrafiltration described in Patent Literatures 1 and 2, since clogging of the membrane is likely to occur, and the membrane needs to be exchanged frequently, there has been a problem that the production cost is increased. Furthermore, in the centrifugation method described in Patent Literature 3, when particles having a small particle size are used, there have been problems that it is difficult to achieve centrifugation, a highly skilled centrifuge operation is required, aggregation of nanoparticles is likely to occur, and an increase in the size of the apparatuses is also difficult. Also, in the methods of using water or a poor solvent as described in Patent Literatures 4 to 6, since an increase in the size of the apparatuses is required while, at the same time, large amounts of waste water or waste solvent should be discharged, there has been a problem that the production cost is increased.

Furthermore, Patent Literature 7 describes a gold nanoparticle composite having an oxidation catalyzing function, in which gold is supported on a star-shaped polymer which has an oxyethylene repeating unit in the arms.

The gold nanoparticle composite is such that even if the composite is left to stand for a long time period in a liquid, aggregation or the like of the gold nanoparticles does not occur, and the composite is stable over time. However, the action of the star-shaped polymer to retain gold nanoparticles thereon is still unsatisfactory, and there has been a problem that when the concentration of the gold nanoparticles in the liquid is increased, gold aggregates and thereby causes settling. Furthermore, when a resin or a crosslinkable compound is incorporated into the dispersion liquid, gold is easily precipitated and settled. Therefore, it has been difficult to utilize the gold nanoparticle composite as a raw material for a membrane material.

Therefore, it is an object of the present invention is to provide a metal nanoparticle composite which has excellent stability over time and retention stability and is useful as a raw material for a metal nanoparticle-dispersed film, a method for producing the same, a metal nanoparticle dispersion liquid, a composition for forming a metal nanoparticle-dispersed film, and a metal nanoparticle-dispersed film.

Solution to Problem

Thus, the inventors of the present invention conducted a thorough investigation in order to solve the problems described above, and as a result, the inventors found that a metal nanoparticle composite obtained by supporting metal nanoparticles on a star-shaped polymer having, in addition to a vinyl ether-based repeating unit, a particular hydrostyrene-based repeating unit in the arms, is excellent not only in the stability over time but also in the retention stability, and is useful as a raw material for a metal nanoparticle-dispersed film.

That is, (i) the present invention is to provide a metal nanoparticle composite in which (B) metal nanoparticles are supported on (A) a star-shaped polymer having a central core and arms bonded to the central core, with the arms comprising a repeating unit represented by formula (1) described below and a repeating unit represented by formula (2) described below.

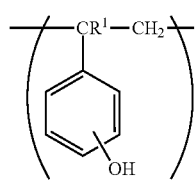
(1)

wherein $R^1$ represents a hydrogen atom or an alkyl group having 1 to 4 carbon atoms.

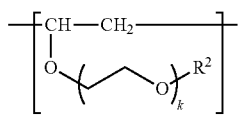
(2)

wherein $R^2$ represents a methyl group or an ethyl group; and k represents an integer from 1 to 10.

Furthermore, (ii) the present invention provides a metal nanoparticle dispersion liquid comprising the composite of the item (i) and an aqueous medium.

Furthermore, (iii) the present invention provides a method for producing a metal nanoparticle composite, the method comprising the following steps (a) and (b):

(a) a step of bringing a star-shaped polymer having a central core and arms bonded to the central core, with the arms comprising a repeating unit represented by the following formula (1) and a repeating unit represented by the following formula (2), into contact with at least one selected from the group consisting of metal salts and metal complex salts in an aqueous medium, and adsorbing at least one selected from the group consisting of metal ions and metal complex ions to the star-shaped polymer:

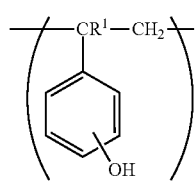
(1)

wherein $R^1$ has the same meaning as defined above,

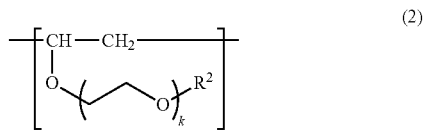
(2)

wherein $R^2$ and k respectively have the same meanings as defined above; and (b) a step of bringing a reducing agent into contact with at least one selected from the group consisting of the metal ions and metal complex ions adsorbed in step (a).

Furthermore, (iv) the present invention provides a composition for forming a metal nanoparticle-dispersed film, the composition comprising the composite of the item (i) and at least one selected from the group consisting of a crosslinkable compound and a film-forming resin.

In addition, (v) the present invention provides a metal nanoparticle-dispersed film obtainable by using the film-forming composition of the item (iv).

Effects of Invention

The metal nanoparticle composite of the present invention has excellent stability over time as well as excellent retention stability, and is useful as a raw material for a metal nanoparticle-dispersed film. Therefore, according to the present invention, a metal nanoparticle dispersion liquid which has excellent dispersibility of metal nanoparticles and is useful as a raw material for a metal nanoparticle-dispersed film can be provided. Furthermore, a composition for forming a metal nanoparticle-dispersed film having excellent dispersibility of metal nanoparticles, and a metal nanoparticle-dispersed film can be provided.

Furthermore, according to the production method of the present invention, the metal nanoparticle composite can be produced conveniently and easily.

DESCRIPTION OF EMBODIMENTS

Figure 1:
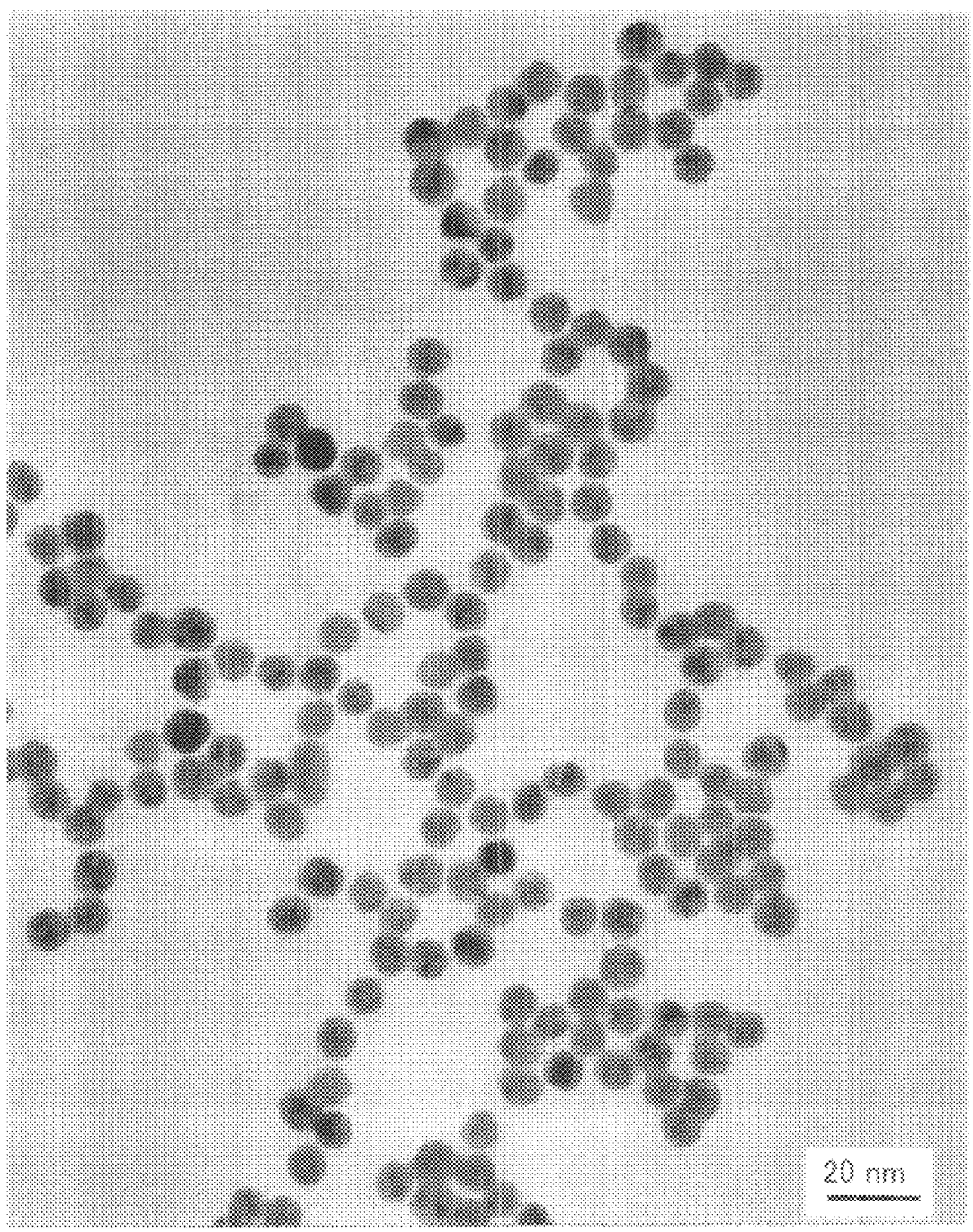
FIG. 1 is a microscopic photograph presenting a TEM image of the gold nanoparticles of Example 1.

The metal nanoparticle composite of the present invention has metal nanoparticles supported on the star-shaped polymer described above.

First, the various constituent components of the metal nanoparticle composite of the present invention will be described in detail.

<Star-Shaped Polymer>

The star-shaped polymer has a central core and arms bonded to the central core. Furthermore, the arms comprise the repeating unit (1) and the repeating unit (2).

The arms are preferably configured to comprise at least two polymer chains bonded to the central core. Examples of these polymer chains include a polymer chain formed from the repeating unit (1), a polymer chain formed from the repeating unit (2), and a polymer chain formed from block bodies of the repeating unit (1) and the repeating unit (2).

Furthermore, it is preferable that the arms be arms comprising a polymer chain formed from the repeating unit (1) and a polymer chain formed from the repeating unit (2), or arms comprising a polymer chain formed from block bodies of the repeating unit (1) and the repeating unit (2).

Furthermore, in the formula (1), $R^1$ represents a hydrogen atom or an alkyl group having 1 to 4 carbon atoms, and an alkyl group having 1 to 4 carbon atoms is preferred. Examples of the alkyl group include a methyl group, an ethyl group, an n-propyl group, an isopropyl group, an n-butyl group, a sec-butyl group, a tert-butyl group, and an isobutyl group. Meanwhile, the position of the hydroxyl group in the formula (1) is an arbitrary position.

Furthermore, in the formula (2), $R^2$ represents a methyl group or an ethyl group. Furthermore, k represents an integer from 1 to 10, and is preferably 1 to 6.

Furthermore, the central core is preferably derived from a divinyl compound, and is more preferably derived from an aromatic divinyl compound or a divinyl ether compound.

Among these, the central core is particularly preferably derived from a compound having a bis(vinyloxymethyl) group, a bis(vinyloxyethyl) group, or a bis(vinylphenoxy) group.

Also, the star-shaped polymer preferably has a lower limit critical solution temperature in an aqueous medium, from the viewpoint of the efficiency of separation and collection of the composite. Here, the lower limit critical solution temperature means a temperature at which a solution state remains as a uniformly dissolved state at a predetermined temperature or less, but the solution undergoes phase separation at a predetermined temperature or more. The lower limit critical temperature is preferably 10° C. to 80° C., and more preferably 15° C. to 60° C.

A polymer having a lower limit critical solution temperature in an aqueous medium dissolves in an aqueous medium at a temperature lower than the lower limit critical solution temperature; however, at a temperature higher than the lower limit critical solution temperature, the polymer has a feature that rapid dehydration of the polymer in the aqueous medium and consequent phase separation caused by hydrophobic interaction occurs, and the solubility in an aqueous medium is significantly decreased. Therefore, as will be described below, a metal nanoparticle composite in an aqueous medium can be caused to aggregate by using this property, and the efficiency of separation and recovery of the composite can be increased.

The lower limit critical solution temperature can be appropriately adjusted by changing the number of oxyethylene units that constitute the repeating unit (2), or the kind of $R^2$ in the repeating unit (2). That is, since the lower limit critical solution temperature is usually manifested while originating from the oxyethylene chain contained in the repeating unit (2), temperature responsiveness can be obtained by adjusting the proportion of the repeating unit (2) or the variability of the degree of polymerization.

Furthermore, the oxyethylene chain contained in the repeating unit (2) has an action of adsorbing and stabilizing metal nanoparticles and a metal salt or a metal complex salt, which serves as the precursor of the metal nanoparticles, the stability over time of the metal nanoparticle composite can be enhanced by increasing the content of the repeating unit (2) in the star-shaped polymer.

On the other hand, when the star-shaped polymer comprises the repeating unit (1), the amount of the metal nanoparticles supported can be increased. Furthermore, by increasing the content of the repeating unit (1), the number of reaction points that are reactive with a crosslinkable compound increases, and the usefulness as a raw material for a dispersed film that will be described below can be increased.

From the viewpoint of achieving a balance between the action of the repeating unit (1) and the action of the repeating unit (2) as such, the content of the repeating unit (2) is preferably 15% to 95% by mole relative to the all the repeating units in the arms. On the other hand, the content of the repeating unit (1) is preferably 5% to 85% by mole. The composition ratios of the respective repeating units of the star-shaped polymer can be arbitrarily selected according to the proportions of the monomers used in living cationic polymerization.

Furthermore, the weight average molecular weight (Mw) of the star-shaped polymer is usually 1000 to 1,000,000, but is preferably 5,000 to 500,000. Furthermore, the molecular weight distribution (Mw/Mn) is usually 1.0 to 3.0, but is preferably 1.0 to 2.0.

Meanwhile, the weight average molecular weight has the same meaning as the relative average molecular weight, and can be determined by a gel permeation chromatographic (GPC) method by using a calibration curve based on polystyrene standards.

Furthermore, the number of arms of the star-shaped polymer is usually 10 to 80, preferably 10 to 70, and more preferably 10 to 60. Such a number of arms may be measured according to the method described in the Examples that will be described below.

Next, a method for producing the star-shaped polymer will be described.

The star-shaped polymer can be produced by, for example, subjecting a compound represented by the following formula (3):

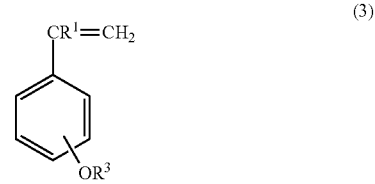

wherein $R^3$ represents hydrogen, or a protective group that is detachable by an acid or an alkali; and $R^1$ has the same meaning as defined above, a compound represented by the following formula (4):

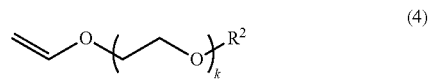

wherein $R^2$ and k respectively have the same meanings as defined above, and a divinyl compound capable of forming a central core, to living cationic polymerization in the presence of an initiator compound and a Lewis acid, and after completion of the polymerization reaction, detaching protective groups as necessary. Meanwhile, the order of living cationic polymerization of the compound (3), the compound (4) and the divinyl compound is arbitrarily, and for each of these compounds, one kind or two or more kinds may be used).

Furthermore, regarding $R^3$, examples of the protective group that is easily detachable by an acid or an alkali include tertiary alkyl groups such as a tert-butyl group; alkoxyalkyl groups such as a 1-methoxyethyl group, a 1-ethoxyethyl group, a 1-methoxypropyl group, a 2-tetrahydropyranyl group, and a 2-tetrahydrofuranyl group; acyl groups such as an acetyl group, a propionyl group, and a tert-butylcarbonyl group; alkoxycarbonyl groups such as a methoxycarbonyl group, an ethoxycarbonyl group, a propoxycarbonyl group, and a tert-butoxycarbonyl group; alkoxycarbonylalkyl groups such as a tert-butoxycarbonylmethyl group; and alkylsilyl groups such as a trimethylsilyl group, and a tert-butyldimethylsilyl group.

Furthermore, examples of the compound (3) include hydroxystyrenes such as p-hydroxystyrene, m-hydroxystyrene, o-hydroxystyrene, p-isopropenylphenol, m-isopropenylphenol, and o-isopropenylphenol; tert-butoxystyrenes such as p-tert-butoxystyrene and m-tert-butoxystyrene; alkoxyalkyloxystyrenes such as p-(1-ethoxyethoxy)styrene, m-(1-ethoxyethoxy)styrene, p-(2-tetrahydropyranyl)oxystyrene, and m-(2-tetrahydropyranyl)oxystyrene; alkanoyloxystyrenes such as p-acetoxystyrene, m-acetoxystyrene, p-tert-butylcarbonyloxystyrene, and m-tert-butylcarbonyloxystyrene; alkoxycarbonyloxystyrenes such as p-methoxycarbonyloxystyrene, m-methoxycarbonyloxystyrene, p-tert-butoxycarbonyloxystyrene, and m-tert-butoxycarbonyloxystyrene; alkoxycarbonylalkyloxystyrenes such as p-tert-butoxycarbonylmethyloxystyrene, and m-tert-butoxycarbonyloxymethylstyrene; and alkylsilyloxystyrenes such as p-trimethylsilyloxystyrene, m-trimethylsilyloxystyrene, p-tert-butyldimethylsilyloxystyrene, and m-tert-butyldimethylsilyloxystyrene. Among these, p-hydroxystyrene, p-isopropenylphenol, p-tert-butoxystyrene, and p-acetoxystyrene are particularly preferred.

Furthermore, examples of the compound (4) include 2-methoxyethyl vinyl ether, 2-ethoxyethyl vinyl ether, 2-(2-methoxyethoxy)ethyl vinyl ether, 2-(2-ethoxyethoxy)ethyl vinyl ether, 2-(2-(2-methoxyethoxy)ethoxy)ethyl vinyl ether, 2-(2-(2-methoxyethoxy)ethoxy)ethoxy)ethyl vinyl ether, and 2-(2-(2-(2-ethoxyethoxy)ethoxy)ethoxy)ethyl vinyl ether.

The divinyl compound may be any compound capable of forming a central core, and examples thereof include aromatic divinyl compounds such as bis(4-vinylphenoxy)methane, 1,2-bis(4-vinylphenoxy)ethane, 1,3-bis(4-vinylphenoxy)propane, 4,4'-[2,2'-oxybis(ethane-2,1-diyl)bis(oxy)]bis(vinylbenzene), and bis[[4-[(4-vinylphenoxy)methyl]cyclohexyl]methyl]terephthalate; and divinyl ether compounds such as ethylene glycol divinyl ether, bisphenol A bis(vinyloxyethylene)ether, bis(vinyloxyethylene)ether, hydroquinone bis(vinyloxyethylene)ether, and 1,4-bis(vinyloxymethyl)cyclohexane.

Furthermore, examples of the initiator compound include compounds which produce protons, such as water, alcohols and protonic acids; and compounds which produce carbocations, such as alkyl halides.

The initiator compound is preferably a cation-supplying compound such as an adduct of the vinyl ether mentioned above and a compound which produces a proton. Specific examples include 1-alkoxyethyl acetates such as 1-isobutoxyethyl acetate.

Regarding the Lewis acid, any Lewis acid that is generally used in the cationic polymerization of a vinyl ether-based monomer or an oxystyrene-based monomer, may be used. Specifically, organometallic halides or metal halides, such as $Et_{1.5}AlCl_{1.5}$, $TiCl_4$, $TiBr_4$, $BCl_3$, $BF_3$, $BF_3 \cdot OEt_2$, $SnCl_2$, $SnCl_4$, $SbCl_5$, $SbF_5$, $WCl_6$, $TaCl_5$, $VCl_5$, $FeCl_3$, $ZnBr_2$, $ZnCl_4$, $AlCl_3$, and $AlBr_3$ can be suitably used. These Lewis acids may be used singly, or plural Lewis acids may be used in combination.

Furthermore, since the compound (3) and the compound (4) have different cationic polymerizability, when the compound (4) is polymerized, it is preferable to use an organo-aluminum halide compound such as $Et_{1.5}AlCl_{1.5}$ as a Lewis acid, and when the compound (3) is polymerized, it is preferable to accelerate the rate of polymerization of the compound (3) by additionally using a metal halogen compound containing an atom other than Al, such as $SnCl_4$ or $FeCl_3$.

Furthermore, the structure of each of the polymer chain in the arms can be controlled by appropriately selecting the order of living polymerizing the respective monomers that form the arms and the divinyl compound that forms the central core.

For example, when the compound (4) is polymerized by living cationic polymerization, subsequently a divinyl compound is added to form a central core, and then the compound (3) is polymerized by living cationic polymerization, a star-shaped polymer having a structure in which polymer chains formed from the repeating unit (1) and polymer chains formed from the repeating unit (2) are each independently extended from a central core, is obtained.

Furthermore, when living cationic polymerization is carried out by using the compound (4) and the compound (3) in this order, and finally a divinyl compound is added to form a central core, a star-shaped polymer having a structure in which polymer chains formed from block bodies of the repeating unit (1) and the repeating unit (2) are extended from a central core, and having the repeating unit (2) in the outer shell, is obtained.

Also, when a central core is formed by using a divinyl compound, and then living cationic polymerization is carried out by using the compound (4) and the compound (3) in this order, a star-shaped polymer having a structure in which polymer chains formed from block bodies of the repeating unit (1) and the repeating unit (2) are extended from a central core, and having the repeating unit (1) in the outer shell, is obtained.

Furthermore, a solvent may also be used in the polymerization reaction. The solvent is not particularly limited, but examples include aromatic hydrocarbon solvents such as benzene, toluene, and xylene; aliphatic hydrocarbon-based solvents such as propane, n-butane, isobutene, n-pentane, n-hexane, n-heptane, n-octane, isooctane, decane, hexadecane, and isopentane; halogenated hydrocarbon-based solvents such as methylene chloride, ethylene chloride, and carbon tetrachloride; and ether-based solvents such as tetrahydrofuran (THF), dioxane, diethyl ether, dibutyl ether, and ethylene glycol diethyl ether. Among these, toluene, methylene chloride, and hexane are suitably used. These solvents may be used singly, or two or more kinds may be used in combination.

The polymerization temperature is usually −80° C. to 150° C., and is preferably −78° C. to 80° C. Furthermore, the polymerization time is usually about 10 hours to 250 hours.

The intended star-shaped polymer may be obtained by adding a reaction terminating agent at a desired degree of polymerization, and thereby terminating the polymerization reaction. The reaction terminating agent may be any compound which acts as an end terminating agent, and/or a compound having a function of deactivating the activity of a Lewis acid. Examples of the reaction terminating agent include alcohols such as methanol, ethanol, and propanol; amines such as dimethylamine and diethylamine; water, aqueous ammonia, and an aqueous sodium hydroxide solution.

Meanwhile, when an oxystyrene-based monomer in which a hydroxyl group is protected with a protective group is used, the oxystyrene-based monomer can be converted to a hydroxystyrene-based repeating unit by, for example, carrying out the reaction at a reaction temperature of 50° C. to 150° C. for a reaction time of 1 hour to 30 hours in a solvent that has been mentioned as an example of the polymerization solvent, in the presence of an acid catalyst such as hydrochloric acid or sulfuric acid, and detaching the protective group.

<Metal Nanoparticles>

There are no particular limitations on the metal element that constitutes the metal nanoparticles, and noble metals are preferred. Examples thereof include gold, silver, platinum, copper, ruthenium, rhodium, palladium, osmium, and iridium. Among them, from the viewpoint of achieving a balance between the coordination performance with the oxyethylene site in the repeating unit (2), and the stability over time and the retention stability of the composite, gold, silver, and copper are preferred.

The particle size of the metal nanoparticles is usually 1 nm to 30 nm, preferably 3 nm to 20 nm, and particularly preferably 5 nm to 10 nm. The particle size can be measured, as will be described in Examples provided below, by means of observation by TEM or the like.

The amount of the metal nanoparticles supported may be appropriately adjusted in accordance with the kind of metal and the intensity of plasmon resonance, and the support amount is usually 0.001 parts to 50 parts by mass, preferably 0.005 parts to 30 parts by mass, and more preferably 0.01 parts to 20 parts by mass, relative to 1 part by mass of the star-shaped polymer. When the support amount is adjusted to 50 parts by mass or less, the action of suppressing aggregation of the metal nanoparticles can be enhanced. On the other hand, when the support amount is adjusted to 0.001 parts by mass or more, productivity can be enhanced, and the content of the metal nanoparticles in a dispersion liquid or a dispersed film can be increased.

Next, the method for producing a metal nanoparticle composite of the present invention will be described.

The method for producing metal nanoparticles of the present invention comprises the steps (a) and (b) described above.

<Step (a)>

The step (a) is preferably an adsorption step of mixing the star-shaped polymer with at least one selected from the group consisting of metal salts and metal complex salts in the aqueous medium, and adsorbing the at least one selected from the group consisting of metal ions and metal complex ions to the star-shaped polymer.

Preferred metal elements for the metal salts and/or metal complex salts are the same as the metal elements for the metal nanoparticles described above. Examples of the metal salts and/or metal complex salts include chloroauric acid, silver nitrate, platinum chloride, copper nitrate, copper sulfate, platinous chloride, palladium chloride, palladium acetate, palladium nitrate, rhodium chloride, rhodium acetate, ruthenium chloride, ruthenium acetate, iridium chloride, and iridium acetate.

Examples of the aqueous medium include water, alcohols, aliphatic ketones, aliphatic polyhydric alcohols, glycol derivatives, and pyrrolidones. Meanwhile, the aqueous media can be used singly or as a mixture of two or more kinds.

Examples of the alcohols include lower alcohols having about 1 to 6 carbon atoms, such as methanol, ethanol, n-propanol, isopropanol, butanol, isobutanol, sec-butanol, and tert-butanol, and examples of the aliphatic ketones include acetone, and methyl ethyl ketone.

Examples of the aliphatic polyhydric alcohols include ethylene glycol, diethylene glycol, triethylene glycol, polyethylene glycol, propylene glycol, dipropylene glycol, polypropylene glycol, and glycerin.

Examples of the glycol derivatives include monoether derivatives such as ethylene glycol monomethyl ether, ethylene glycol monoethyl ether, ethylene glycol monobutyl ether, propylene glycol monomethyl ether, propylene glycol monoethyl ether, propylene glycol monobutyl ether, diethylene glycol monomethyl ether, diethylene glycol monoethyl ether, diethylene glycol monobutyl ether, triethylene glycol monomethyl ether, triethylene glycol monoethyl ether, and dipropylene glycol monomethyl ether; diether derivatives such as ethylene glycol dimethyl ether, diethylene glycol dimethyl ether, triethylene glycol dimethyl ether, propylene glycol dimethyl ether, dipropylene glycol dimethyl ether, and tripropylene glycol dimethyl ether; and ester derivatives such as ethylene glycol diacetate and ethylene glycol monomethyl ether acetate.

Examples of the pyrrolidones include 2-pyrrolidone, N-methyl-2-pyrrolidone, 2-oxazolidone, and 1,3-dimethyl-2-imidazolidinone.

Among these, water, alcohols, aliphatic ketones, aliphatic polyhydric alcohols, pyrrolidones, and mixtures thereof are preferred, and from the viewpoint of the stability of the metal nanoparticle composite, water, alcohols, aliphatic ketones, and mixtures of water and alcohols are preferred.

Furthermore, the amount of use of the aqueous medium is preferably 0.3 mL to 10 mL, more preferably 0.4 mL to 10 mL, and particularly preferably 0.5 mL to 10 mL, relative to 1 mg of the star-shaped polymer.

<Step (b)>

The step (b) is preferably a reduction step of adding a reducing agent to the solution obtained in the adsorption step, and converting the at least one selected from the group consisting of metal ions and metal complex ions that have been adsorbed, to nanoparticles.

There are no particular limitations on the reducing agent, and examples include inorganic compounds such as alkali metal borohydrides such as sodium borohydride, phosphonic acid salts, hypochlorous acid salts, thiosulfuric acid salts, sulfurous acid salts, and dithionous acid salts; various amines, diamines and imines, such as hydrazine compounds, ethylenediamine, urea, thiourea, and dimethylaminoboran; various aldehydes such as formaldehyde, acetaldehyde, and propionaldehyde; various thiols such as methanethiol, ethanethiol, and propanethiol; hydroquinone, tannic acid, citric acid or salts thereof, succinic acid or salts thereof, and ascorbic acid or salts thereof.

Among these, alkali metal borohydrides such as sodium borohydride, hydrazine compounds, citric acid or salts thereof, succinic acid or salts thereof, and ascorbic acid or salts thereof are preferred, and from the viewpoints of reduction capacity and workability, sodium borohydride is particularly preferred.

The amount of use of the reducing agent is usually 1 to 100 molar equivalents, and preferably 1 to 50 molar equivalents, based on the metal salt or metal complex salt.

The production method of the present invention may further comprise the following steps (c) and (d). In this case, the star-shaped polymer is a star-shaped polymer having a lower limit critical solution temperature in an aqueous medium.

(c) A step of heating an aqueous medium comprising the metal nanoparticle composite obtained in the step (b) to a temperature higher than the lower limit critical solution temperature of the star-shaped polymer, separating an aggregate phase comprising the metal nanoparticle composite and a liquid phase comprising the aqueous medium, and collecting the aggregate phase; and (d) A step of dispersing the aggregate phase collected in the step (c) in an aqueous medium that is identical with or different from the aqueous medium used in the step (a) at a temperature lower than the lower limit critical solution temperature of the star-shaped polymer.

Meanwhile, a temperature higher than the lower limit critical solution temperature as described above is about +10° C. to +50° C. with respect to the lower limit critical solution temperature, and a temperature lower than the lower limit critical solution temperature as described above is about −10° C. to −30° C. with respect to the lower limit critical solution temperature.

In regard to the step (c), the method for separating the aggregate phase and the liquid phase and collecting the aggregate phase is not particularly limited, and separation methods that are already known in the pertinent art, such as filtration, decantation and centrifugation, can be utilized. Furthermore, there are also no particular limitations on the conditions of this separation method, and the conditions may be appropriately set depending on the precipitates produced. According to the present invention, among the separation methods, filtration using a general filter material such as a filter paper, a hydrophilic PTFE filter, a glass fiber filter or a glass prefilter is preferred.

Meanwhile, the aqueous medium used in the step (d) may be any of those media mentioned in the step (a).

As such, the metal nanoparticle composite of the present invention may be obtained conveniently and easily, by the production method comprising the steps (a) and (b) described above, and optionally the steps (c) and (d).

Since the metal nanoparticle composite has metal nanoparticles supported on the aforementioned star-shaped polymer as will be described in the Examples that follow, the metal nanoparticle composite has excellent stability over time in an aqueous medium.

Furthermore, the metal nanoparticle composite of the present invention is such that even if metal nanoparticles are highly concentrated in the aqueous medium (for example, the content of the metal nanoparticles is preferably about 1 g/L to 5 g/L, and more preferably about 2 g/L to 5 g/L, in the aqueous medium), or a crosslinkable compound or the like is incorporated, the metal nanoparticles do not undergo aggregation or the like and are stably retained. Thus, the metal nanoparticle composite exhibits excellent retention stability in the aqueous medium. Furthermore, even if a crosslinkable compound is incorporated into the dispersion liquid, since the composite is stably retained, the composite is highly useful as a raw material for a metal nanoparticle-dispersed film.

Next, the metal nanoparticle dispersion liquid of the present invention will be described.

The metal nanoparticle dispersion liquid of the present invention comprises the metal nanoparticle composite and the aqueous medium described above.

In the metal nanoparticle dispersion liquid of the present invention, a dispersant may also be incorporated in addition to the metal nanoparticle composite and the aqueous medium described above.

Examples of the dispersant include a water-soluble resin, a water-soluble saccharide composition including oligosaccharides, and a surfactant.

Examples of the water-soluble resin include resins having hydroxyl groups as hydrophilic structural units, such as polyvinyl alcohol (PVA (degree of polymerization: about 100 to 5000)), modified polyvinyl alcohol-based resins (cation-modified polyvinyl alcohols, anion-modified polyvinyl alcohols, and silanol-modified polyvinyl alcohols), polyvinyl acetal, cellulose ether-based resins [methyl cellulose (MC), ethyl cellulose (EC), hydroxyethyl cellulose (HEC), carboxymethyl cellulose (CMC), hydroxypropyl cellulose (HPC), and the like], chitins, chitosans, and starches; resins having hydrophilic ether bonds, such as polyethylene glycol (PEG), polyethylene oxide (PEO), polypropylene oxide (PPO), and polyvinyl ether (PVE); and resins having hydrophilic amide groups or amide bonds, such as polyacrylamide (PAAM) and polyvinyl pyrrolidone (PVP). Furthermore, polyacrylic acid salts, maleic acid resins, alginic acid salts, gelatins and the like, which have carboxyl groups as dissociable groups, may also be used.

Among these, polyvinyl alcohol (PVA), modified polyvinyl alcohol-based resins, polyethylene glycol (PEG), polyethylene oxide (PEO), polyvinyl pyrrolidone (PVP), and cellulose ether-based resins are preferred. Among these, polyvinyl alcohol (PVA), modified polyvinyl alcohol-based resins, ethylene glycol (PEG), polyethylene oxide (PEO), polyvinyl pyrrolidone (PVP), and cellulose ether-based resins are preferred, and polyvinyl alcohol (PVA) and modified polyvinyl alcohol-based resins are particularly preferred.

Meanwhile, the dispersants can be used singly or in combination of two or more kinds.

The content of the dispersant is, for example, about 0.1% to 30% by mass, and preferably 0.5% to 20% by mass, relative to the total amount of the metal nanoparticle dispersion liquid.

The metal nanoparticle dispersion liquid of the present invention can be conveniently and easily obtained in the same manner as in the production method comprising the steps (a) and (b), and optionally the steps (c) and (d). Particularly, when the steps (c) and (d) are carried out, an aggregate phase comprising the metal nanoparticle composite and a liquid phase comprising ionic impurities and the like can be separated by a convenient operation such as temperature control, and therefore, a metal nanoparticle dispersion liquid having fewer impurities can be obtained inexpensively and conveniently.

In addition, in the case of using the dispersant, the dispersant may be used by being added to the mixed solution obtained by the steps (a) to (b) or the steps (a) to (d), or may also be added together with the star-shaped polymer to the step (a).

Furthermore, the metal nanoparticle dispersion liquid of the present invention has excellent dispersibility as will be described in the Examples that follow. Also, even if the metal nanoparticles are highly concentrated, or a crosslinkable compound or a film-forming resin that will be described below is incorporated, since a high degree of dispersion of the metal nanoparticles is maintained, the metal nanoparticle dispersion liquid is highly useful as a raw material of a metal nanoparticle-dispersed film.

Next, the composition for forming a metal nanoparticle-dispersed film of the present invention will be described.

The composition for forming a metal nanoparticle-dispersed film of the present invention comprises the metal nanoparticle composite and at least one selected from the group consisting of a crosslinkable compound and a film-forming resin.

Such compositions for forming a film can be roughly classified into:

(1) a resin composition: a composition comprising a metal nanoparticle composite and a film-forming resin (does not comprise a crosslinkable compound), and (2) a curable composition: a composition comprising a metal nanoparticle composite and a crosslinkable compound (may comprise a film-forming resin).

Furthermore, the film-forming composition preferably comprises the aqueous medium described above.

<Film-Forming Resin>

Examples of the film-forming resin include the water-soluble resins described above. Furthermore, when the aqueous medium is a medium other than water, a non-water-soluble resin can also be used.

Among the water-soluble resins, the film-forming properties can be enhanced by using PVA, a modified polyvinyl alcohol-based resin, PEG, PEO, PVP, or a cellulose ether-based resin. Particularly, when PVA or a modified polyvinyl alcohol-based resin is used, if the resin is used together with the crosslinkable compound, a three-dimensionally crosslinked structure is formed by the action of hydroxyl groups, and the film strength, solvent resistance and the like can be enhanced.

The non-water-soluble resin is preferably an acrylic resin. Examples of the acrylic resin include polymers of methacrylic acid lower alkyl esters, such as methyl methacrylate, ethyl methacrylate, propyl methacrylate, and butyl methacrylate, or copolymers containing these esters as main components; and polymers of acrylic acid lower alkyl esters, such as methyl acrylate, ethyl acrylate, propyl acrylate, and butyl acrylate, or copolymers containing these esters as main components. Among these, polymethyl methacrylate (PMMA) and copolymers containing methyl methacrylate as a main component (all having $Mw=$about $10^4$ to $10^6$) are preferred.

Meanwhile, the film-forming resins can be used singly or in combination of two or more kinds.

The content of the film-forming resin may be appropriately selected in accordance with the metal content, but the content is usually 0.1% to 30% by mass, and preferably 0.5% to 20% by mass, of the film-forming composition. When this content is adjusted to 0.1% by mass or more, the metal nanoparticle-dispersed film that will be described below can be conveniently obtained, and when the content is adjusted to 30% by mass or less, dispersibility can be enhanced.

<Crosslinkable Compound>

The crosslinkable compound is preferably a compound capable of causing a dehydration condensation reaction, an addition reaction, a cationic polymerization reaction or the like with the phenolic hydroxyl group of the star-shaped polymer under the action of heat or acid, bringing about crosslinking or an increase in molecular weight, and forming a crosslinked film. Examples of such a crosslinkable compound include isocyanates, amino resins, phenolic resins, amines, epoxy compounds, oxetane compounds, melamine derivatives, and urea derivatives. Furthermore, a crosslinked body produced by utilizing a hydrolysis condensation reaction of silane can also be obtained.

Furthermore, as the crosslinkable compound, a vinyl compound having at least one radical polymerizable unsaturated bond may also be used in combination. In this case, a known photoradical polymerization initiator is preferably used. Examples of the vinyl compound having a radical polymerizable unsaturated bond include vinyl compounds having at least one of acryloyl group, a methacryloyl group, an allyl group and the like.

The content of the crosslinkable compound is, for example, 0.1% to 40% by mass, and preferably 1% to 20% by mass, of the film-forming composition.

Meanwhile, the film-forming composition can be prepared according to the method for preparing a metal nanoparticle dispersion liquid described above.

Furthermore, the composition for forming a metal nanoparticle-dispersed film of the present invention is such that, as will be described below in the Examples, even if the metal nanoparticles are highly concentrated, or a crosslinkable compound or a film-forming resin is incorporated, a high degree of dispersion of the metal nanoparticles is maintained. Therefore, the composition for forming a metal nanoparticle-dispersed film is highly useful as a raw material for a metal nanoparticle-dispersed film.

Next, the metal nanoparticle-dispersed film of the present invention will be described.

The metal nanoparticle-dispersed film of the present invention is obtainable by using the film-forming composition, and specifically, the metal nanoparticle-dispersed film can be obtained by applying the film-forming composition on a base material or forming the composition into a film form, and solidifying the composition.

The application of the film-forming composition may be carried out according to a conventional method, and for example, the application can be carried out by using a solution casting method, a bar coating method, a spin coating method, a knife coating method, a roll coating method, a blade coating method, a die coating method, a gravure coating method, a dip coating method, an inkjet application method, a dispenser application method, or a spray application method.

Solidification of the coating film can be carried out primarily by heating. For example, when a curable composition is used, a metal nanoparticle-dispersed film can be obtained by heating and curing the crosslinkable compound contained in the curable composition under the crosslinking conditions for the crosslinkable compound. In this case, the coating film may also be thermally cured after the coating film is preliminarily dried to remove the aqueous medium.

On the other hand, when the resin composition described above that does not comprise a crosslinkable compound is used, a metal nanoparticle-dispersed film can be obtained by removing the aqueous medium by heating and drying.

The metal nanoparticle-dispersed film of the present invention is such that, as will be described in the Examples that follow, even if the metal nanoparticles are highly concentrated, or a crosslinkable compound or a film-forming resin is incorporated, a high degree of dispersion of the metal nanoparticles is maintained. Therefore, the metal nanoparticle-dispersed film of the present invention enables application to electronic devices such as an organic dye type solar cell or a sensor, or optical devices.

EXAMPLES

Hereinafter, the present invention will be described in detail by way of Examples, but the present invention is not intended to be limited to the following Examples.

The analysis conditions for various characteristics in the Examples are as described below.

<Measurement of Weight Average Molecular Weight (Including Relative Molecular Weight that Will be Described Below) and Molecular Weight Distribution of Polymer>

The weight average molecular weight (Mw) and molecular weight distribution (Mw/Mn) described above were measured by a gel permeation chromatographic method (hereinafter, also called GPC) by using an RI detector mounted in a GPC apparatus [HLC-8320 GPC (manufactured by Tosoh Corp.)], and by making a comparison with a calibration curve produced with polystyrene standards [column: Shodex® LF804 (manufactured by Showa Denko K.K.)×3 column, eluent: tetrahydrofuran].

<Measurement of Absolute Molecular Weight of Star-Shaped Polymer>

The absolute molecular weight (Mw) was measured by a GPC-viscosity method [light scattering analyzer: DLS-6000AL (manufactured by Otsuka Electronics Co., Ltd.), column: manufactured by Showa Denko K.K., Shodex® KF-800D+KF-805L×2 columns, eluent: tetrahydrofuran].

<Calculation of Number of Arms of Star-Shaped Polymer>

The number of arms (f) was calculated according to the following formula.

$f$=(Weight fraction of monomer forming the arms)×(absolute molecular weight)/(relative molecular weight)

<Measurement of Absorption Spectrum>

The absorption spectrum was measured by using an ultraviolet-visible spectrophotometer (V-570 Spectrophotometer: manufactured by JASCO Corp.).

<Observation by Transmission Electron Microscope (TEM)>

TEM images of the metal nanoparticles were observed by using a TEM (Model JEM-2010F: manufactured by JEOL, Ltd.), by mounting a metal nanoparticle dispersion liquid on Cu mesh on a carbon supportive film at an accelerating voltage of 200 kV.

Synthesis Example 1

Synthesis of Star-Shaped Polymer A [TEGVE-Core (CHDVE)-PIPP-Based Star-Shaped Polymer]

A glass container equipped with a three-way stopcock was provided, and the container was charged with argon. The adsorbed water inside the container was removed by heating. Subsequently, 0.18 M (15.2 g) 2-(2-(2-(2-methoxyethoxy)ethoxy)ethoxy)ethyl vinyl ether (hereinafter, also referred to as "TEGVE"), 4.3 Methyl acetate, 17 mM 1-isobutoxyethyl acetate (hereinafter, also referred to "IBEA"), and 222 mL of toluene were added into the container, and the reaction system was cooled. When the temperature reached −10° C., a toluene solution of $Et_{1.5}AlCl_{1.5}$ (13 mM in terms of $Et_{1.5}AlCl_{1.5}$) was added thereto, and polymerization was initiated.

At the time point when conversion of TEGVE was completed, a small amount of the reaction solution was collected, and methanol containing sodium methoxide was added thereto to terminate the reaction. The weight average molecular weight and the molecular weight distribution of the TEGVE polymer thus obtained were measured, and as a result, such a polymer was a monodisperse polymer with Mw=3000 and Mw/Mn=1.12.

Subsequently, 33 mM (2.9 g) cyclohexanedimethanol divinyl ether (hereinafter, also called "CHDVE") was added to the reaction system described above, and while the temperature inside the reaction system was maintained at −10° C., the reaction was continued.

The conversion of the vinyl groups of CHDVE was monitored in a time-sliced manner by using GPC, and at the time point when the waveform of GPC became constant, a small amount of the reaction solution was collected. Methanol containing sodium methoxide was added thereto to terminate the reaction. The weight average molecular weight and the molecular weight distribution of the TEGVE-core (CHDVE)-based star-shaped polymer thus obtained were measured, and as a result, such a polymer was a monodisperse polymer with Mw=15,000 and Mw/Mn=1.25. Furthermore, it was confirmed from the chart of this polymer that the peak originating from TEGVE had completely disappeared.

Subsequently, an ethyl acetate solution of p-isopropenylphenol (hereinafter, also called "PIPP") (33 mM (2.0 g) in terms of PIPP) was added to the reaction system described above, and a toluene solution of $SnCl_4$ (53.5 mM in terms of $SnCl_4$) was added thereto. The reaction was continued for 5 hours. Thereafter, methanol containing sodium methoxide (5 M in terms of sodium methoxide) was added to the reaction system to terminate the reaction, and then an intended star-shaped polymer A was obtained.

The weight average molecular weight and the molecular weight distribution of the star-shaped polymer A thus obtained were measured, and as a result, the star-shaped polymer A was a monodisperse polymer with Mw=15400 and Mw/Mn=1.36.

Subsequently, an ion exchange resin [product name: AMBERLYST MSPS2-1.DRY, manufactured by Organo Corp.] was added in an amount of 5% by mass to the solution in which the aforementioned reaction had been terminated, and the reaction solution was stirred for one hour at room temperature. Subsequently, this solution was passed through Celite and a filter having a pore diameter of 1 μm, and the filtrate was concentrated under reduced pressure by using an evaporator to purify the star-shaped polymer A.

The relative molecular weight, molecular weight distribution, and absolute molecular weight of the star-shaped polymer A after purification were measured, and as a result, the relative molecular weight (Mw) was 14,000, Mw/Mn was 1.43, while the absolute molecular weight (Mw) was 26,700. Furthermore, the number of arms (f) calculated from the relative molecular weight and the absolute molecular weight was 12.

Synthesis Example 2

Synthesis of Star-Shaped Polymer B [PIPP-TEGVE-Core (CHDVE)-Based Star-Shaped Polymer]

A glass container equipped with a three-way stopcock was provided, and the container was charged with argon. The adsorbed water inside the container was removed by heating. Subsequently, 26.9 mM (2.5 g) CHDVE, 4.3 Methyl acetate, 13.5 mM IBEA, and 185 mL of toluene were added into the container, and the reaction system was cooled. When the temperature reached −10° C., a toluene solution of $Et_{1.5}AlCl_{1.5}$ (10.8 mM in terms of $Et_{1.5}AlCl_{1.5}$) was added thereto, and polymerization was initiated.

The conversion of the vinyl groups of CHDVE was monitored in a time-sliced manner by using GPC, and at the time point when the waveform of GPC became constant, a small amount of the reaction solution was collected. Methanol containing sodium methoxide was added thereto to terminate the reaction. The weight average molecular weight and the molecular weight distribution of the core (CHDVE) polymer thus obtained were measured, and as a result, such a polymer was a monodisperse polymer with Mw=16,900 and Mw/Mn=1.77.

Subsequently, 0.17 M (15.2 g) of TEGVE was added to the reaction system described above, and while the temperature inside the reaction system was maintained at −10° C., the reaction was continued.

At the time point when conversion of TEGVE was completed, a small amount of the reaction solution was collected, and methanol containing sodium methoxide was added thereto to terminate the reaction. The weight average molecular weight and the molecular weight distribution of the TEGVE-core (CHDVE)-based star-shaped polymer thus obtained were measured, and as a result, such a polymer was a monodisperse polymer with Mw=45,500 and Mw/Mn=1.70. Furthermore, it was confirmed from the chart of this polymer that the peak originating from CHDVE had completely disappeared.

Subsequently, an ethyl acetate solution of PIPP (27 mM (1.7 g) in terms of PIPP) was added to the reaction system described above, and 150 mL of THF and an ethyl acetate solution of $FeCl_3$ (15.5 mM in terms of $FeCl_3$) were further added thereto. The reaction was continued for 5 hours. Thereafter, methanol containing sodium methoxide (5 M in terms of sodium methoxide) was added to the reaction system to terminate the reaction, and thus an intended star-shaped polymer B was obtained.

The weight average molecular weight and the molecular weight distribution of the star-shaped polymer B thus obtained were measured, and as a result, the star-shaped polymer B was a monodisperse polymer with Mw=49,700 and Mw/Mn=1.79.

Subsequently, an ion exchange resin [product name: AMBERLYST MSPS2-1.DRY, manufactured by Organo Corp.] was added in an amount of 10% by mass to the solution in which the aforementioned reaction had been terminated, and the reaction solution was stirred for one hour at room temperature. Subsequently, this solution was passed through Celite and a filter having a pore diameter of 1 μm, and the filtrate was concentrated under reduced pressure by using an evaporator to purify the star-shaped polymer B.

The relative molecular weight and molecular weight distribution of the star-shaped polymer B after purification were measured, and as a result, the relative molecular weight (Mw) was 45,100, and Mw/Mn was 1.78.

Synthesis Example 3

Synthesis of Star-Shaped Polymer C [TEGVE-Core (CHDVE)-Based Star-Shaped Polymer]

A glass container equipped with a three-way stopcock was provided, and the container was charged with argon. The adsorbed water inside the container was removed by heating. Subsequently, 0.18 M (15.2 g) TEGVE, 4.3 Methyl acetate, 17 mM IBEA, and 222 mL of toluene were added into the container, and the reaction system was cooled. When the temperature reached −10° C., a toluene solution of $Et_{1.5}AlCl_{1.5}$ (13 mM in terms of $Et_{1.5}AlCl_{1.5}$) was added thereto, and polymerization was initiated.

At the time point when conversion of TEGVE was completed, a small amount of the reaction solution was collected, and methanol containing sodium methoxide was added thereto to terminate the reaction. The weight average molecular weight and the molecular weight distribution of the TEGVE polymer thus obtained were measured, and as a result, such a polymer was a monodisperse polymer with Mw=3,500 and Mw/Mn=1.26.

Subsequently, 33 mM (2.9 g) CHDVE was added to the reaction system described above, and while the temperature inside the reaction system was maintained at −10° C., the reaction was continued.

The conversion of the vinyl groups of CHDVE was monitored in a time-sliced manner by using GPC, and at the time point when the waveform of GPC became constant, methanol containing sodium methoxide (5 M in terms of sodium methoxide) was added thereto to terminate the reaction, and thus an intended star-shaped polymer C was obtained.

The weight average molecular weight and the molecular weight distribution of the star-shaped polymer C thus obtained were measured, and as a result, the star-shaped polymer C was a monodisperse polymer with Mw=14,400 and Mw/Mn=1.27.

Subsequently, an ion exchange resin [product name: AMBERLYST MSPS2-1.DRY, manufactured by Organo Corp.] was added in an amount of 5% by mass to the solution in which the aforementioned reaction had been terminated, and the reaction solution was stirred for one hour at room temperature. Subsequently, this solution was passed through Celite and a filter having a pore diameter of 1 μm, and the filtrate was concentrated under reduced pressure by using an evaporator to purify the star-shaped polymer C.

The relative molecular weight and the molecular weight distribution of the star-shaped polymer C after purification were measured, and as a result, the relative molecular weight (Mw) was 14,400, and Mw/Mn was 1.29.

Example 1

Preparation of Gold Nanoparticle Dispersion Liquid (1)

In a 100-mL glass pear-shaped flask, 27 mg of the star-shaped polymer A obtained in Synthesis Example 1, 1.8 mL of an aqueous solution of chloroauric acid having a metal content of 1 mol/L (354 mg in terms of gold), and 90 mL of ion-exchanged water were charged, and the mixture was stirred. Subsequently, while stirring was maintained, $NaBH_4$ was added thereto in an amount of 10 molar equivalents with respect to chloroauric acid, and a reduction reaction was carried out for one hour at room temperature. Thus, a gold nanoparticle dispersion liquid containing a gold nanoparticle composite was obtained.

The dispersion liquid was red in color, and the absorption spectrum of this dispersion liquid was measured. An absorption of plasmon originating from gold nanoparticles was observed near 540 nm, and thus, it was acknowledged that gold nanoparticles had been produced.

Furthermore, the dispersion liquid was observed by using TEM, and it was confirmed that the particle size of the gold nanoparticles thus produced was about 8 nm, and that the deviation in the particle size between the particles was very small. The results are presented in FIG. 1.

From these results, it was found that, a gold nanoparticle composite in which the star-shaped polymer A was used, even if the gold nanoparticles in the aqueous medium were highly concentrated, the composite retained the gold nanoparticles and had excellent retention stability. Furthermore, it was found that the dispersion liquid containing this composite had excellent dispersibility.

Furthermore, even if the dispersion liquid was left to stand for 6 months or longer, and then the absorption spectrum was measured, no change in the absorption spectrum was observed.

From these results, it was clearly understood that the gold nanoparticles were supported on the star-shaped polymer A in a highly dispersed state, even after being left to stand for a long time, and the gold nanoparticles exist in a very stable state without causing aggregation or any change in the size, shape or morphology.

Example 2

Preparation of Silver Nanoparticle Dispersion Liquid (1)

In a 100-mL glass pear-shaped flask, 23 mg of the star-shaped polymer A obtained in Synthesis Example 1, 7.85 µL of an aqueous solution of silver nitrate having a metal content of 1 mol/L (0.85 mg in terms of silver), and 74 mL of ion-exchanged water were added, and the mixture was stirred. Subsequently, while stirring was maintained, $NaBH_4$ was added thereto in an amount of 10 molar equivalents with respect to silver nitrate, and a reduction reaction was carried out for one hour at room temperature. Thus, a silver nanoparticle dispersion liquid containing a silver nanoparticle composite was obtained.

The dispersion liquid was yellow in color, and the absorption spectrum of this dispersion liquid was measured. An absorption of plasmon originating from silver nanoparticles was observed near 395 nm.

Example 3

Preparation of Gold Nanoparticle Dispersion Liquid (2)

In a 100-mL glass pear-shaped flask, 27 mg of the star-shaped polymer B obtained in Synthesis Example 2, 1.8 mL of an aqueous solution of chloroauric acid having a metal content of 1 mol/L (354 mg in terms of gold), and 90 mL of ion-exchanged water were added, and the mixture was stirred. Subsequently, while stirring was maintained, $NaBH_4$ was added thereto in an amount of 10 molar equivalents with respect to chloroauric acid, and a reduction reaction was carried out for one hour at room temperature. Thus, a gold nanoparticle dispersion liquid containing a gold nanoparticle composite was obtained.

The dispersion liquid was red in color, and the absorption spectrum of this dispersion liquid was measured. An absorption of plasmon originating from gold nanoparticles was observed near 535 nm, and thus, it was acknowledged that gold nanoparticles had been produced.

Comparative Example 1

Preparation of Gold Nanoparticle Dispersion Liquid (3)

Preparation of a gold nanoparticle dispersion liquid was carried out by the same operation as that of Example 1, except that the star-shaped polymer C obtained in Synthesis Example 3 was used instead of the star-shaped polymer A.

The solution thus obtained was colorless, and a precipitate was observed. Furthermore, an absorption spectrum of this solution was measured, but absorption of the plasmon near 530 nm was not observed, and a gold nanoparticle dispersion liquid could not be obtained.

Comparative Example 2

Preparation of Gold Nanoparticle Dispersion Liquid (4)

In a 100-mL glass pear-shaped flask, 2.7 mg of the star-shaped polymer C obtained in Synthesis Example 3, 0.18 mL of an aqueous solution of chloroauric acid having a metal content of 1 mol/L (35.4 mg in terms of gold), and 90 mL of ion-exchanged water were added, and the mixture was stirred. Subsequently, while stirring was maintained, $NaBH_4$ was added thereto in an amount of 10 molar equivalents with respect to chloroauric acid, and a reduction reaction was carried out for one hour at room temperature. Thus, an aqueous solution of gold nanoparticles was obtained.

The aqueous solution thus obtained was red in color, and the absorption spectrum of this aqueous solution was measured. An absorption of plasmon originating from gold nanoparticles was observed near 540 nm, and thus, it was acknowledged that gold nanoparticles had been produced.

Example 4

Preparation of Gold Nanoparticle Dispersion Liquid (5) (Ethanol Solution)

50 mL of the gold nanoparticle dispersion liquid obtained in Example 1 was heated for 3 hours at a temperature (60° C.) higher by 10° C. than the temperature of the lower limit critical solution temperature of the star-shaped polymer, and the dispersion liquid was separated into solutions of two phases, namely, an aggregate phase and an aqueous phase. At this time, the gold nanoparticles were precipitated in the aggregate phase in a state of being supported on the star-shaped polymer.

Subsequently, the aggregate phase was filtered through a filter paper (0.1 µm), and a gold nanoparticle composite was collected. The gold nanoparticle composite thus collected was dissolved in 50 mL of ethanol at 40° C., and thus a gold nanoparticle dispersion liquid containing a gold nanoparticle composite was obtained.

The dispersion liquid thus obtained was dissolved in ethanol, and was red in color. Furthermore, an absorption spectrum of this dispersion liquid was measured, and an absorption of plasmon originating from gold nanoparticles was observed near 540 nm. Thus, it was acknowledged that gold nanoparticles had been produced.

Figure 2:
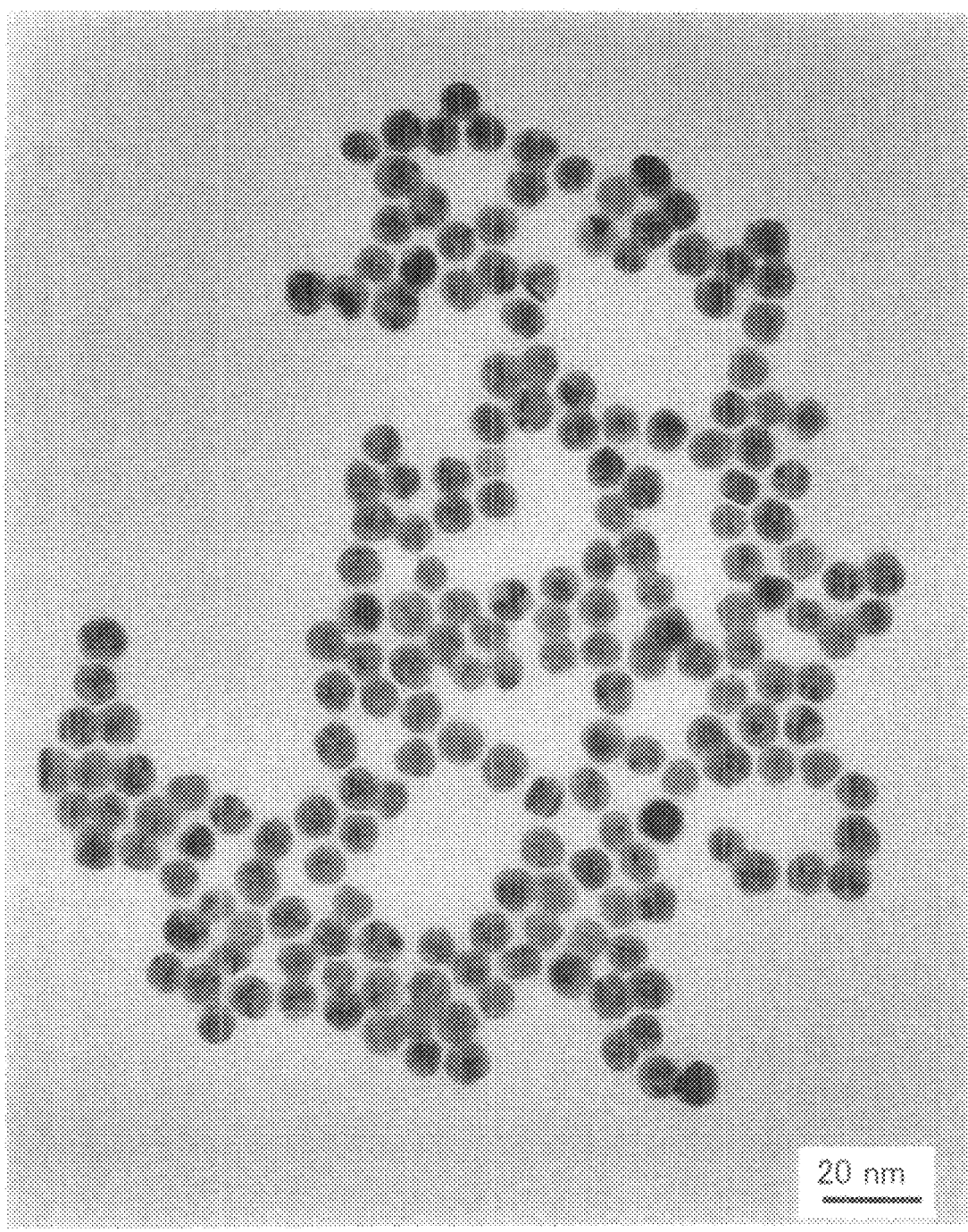
FIG. 2 is a microscopic photograph presenting a TEM image of the gold nanoparticles of Example 4.

Furthermore, the dispersion liquid was observed by using TEM, and the gold nanoparticles thus produced had a particle size (about 8 nm) and a shape that were almost equivalent to those of the gold nanoparticles of Example 1. The results are presented in FIG. 2.

From these results, it was confirmed that there was neither aggregation of the gold nanoparticles nor any change in the size, shape and morphology of the gold nanoparticles resulting from the operations of aggregation and re-dissolution of a gold nanoparticle composite.

Example 5

Preparation of Gold Nanoparticle Dispersion Liquid (6) (Acetone Solution)

50 mL of the gold nanoparticle dispersion liquid obtained in Example 1 was heated for one hour at a temperature (70° C.) higher by 20° C. than the lower limit critical solution temperature of the star-shaped polymer. Thus, the dispersion liquid was separated into solutions of two phases, namely, an aggregate phase and an aqueous phase. At this time, the gold nanoparticles were precipitated in the aggregate phase in a state of being supported on the star-shaped polymer.

Subsequently, the aggregate phase was filtered through a filter paper (0.1 µm), and thus a gold nanoparticle composite was collected. The gold nanoparticle composite thus collected was dissolved in 7.9 mL of acetone at 40° C., and thus a gold nanoparticle dispersion liquid containing a gold nanoparticle composite was obtained.

The dispersion liquid thus obtained was dissolved in acetone, and was red in color. Furthermore, an absorption spectrum of this dispersion liquid was measured, and an absorption of plasmon originating from gold nanoparticles was observed near 540 nm. Thus, it was acknowledged that gold nanoparticles had been produced.

Example 6

Preparation of Gold Nanoparticle Dispersion Liquid (7) (Addition of PVA)

1 g of polyvinyl alcohol (manufactured by Wako Pure Chemical Industries, Ltd., degree of polymerization: 500, degree of saponification; 98) (hereinafter, also called "PVA") was added to 9 g of the gold nanoparticle dispersion liquid obtained in Example 1, and the temperature was increased from room temperature to 95° C. The mixture was left to stand for 2 hours at 95° C. to completely dissolve PVA, and thus, a PVA-added gold nanoparticle dispersion liquid was obtained.

The dispersion liquid thus obtained was red in color, and the gold nanoparticles were stably retained without causing aggregation or the like.

Example 7

Preparation of Composition for Forming Gold Nanoparticle-Dispersed Film (1)

<Preparation of Hydrophilic Sol-Gel Liquid>

10 g of tetramethylsilane (LS470 manufactured by Shin-Etsu Chemical Co., Ltd.), 15.04 g of methanol, 9.4 g of ion-exchanged water, and 1.5 g of 0.2 mol/L hydrochloric acid were mixed, and the mixture was stirred for 30 minutes at room temperature. Thus, a hydrophilic sol-gel liquid was obtained.

<Preparation of Composition for Forming Gold Nanoparticle-Dispersed Film>

1 g of the hydrophilic sol-gel liquid, and 5 g of the gold nanoparticle dispersion liquid obtained in Example 6 were mixed, and the mixture was stirred for 24 hours at room temperature. Thus, a composition for forming a gold nanoparticle-dispersed film was obtained.

The film-forming composition thus obtained was red in color, and regardless of the inclusion of tetramethylsilane, which is a crosslinkable compound, and a high concentration of gold nanoparticles, the gold nanoparticles were stably retained without causing aggregation or the like.

Example 8

Preparation of Composition for Forming Gold Nanoparticle-Dispersed Film (2)

5 g of the gold nanoparticle dispersion liquid obtained in Example 5 and 5 g of a 10 mass acetone solution of polymethyl methacrylate (manufactured by Sigma-Aldrich Co., Mw=120,000) were mixed, and thus a composition for forming a gold nanoparticle-dispersed film was obtained.

The film-forming composition thus obtained was red in color, and regardless of the inclusion of polymethyl methacrylate, the gold nanoparticles were stably retained without causing aggregation or the like.

Comparative Example 3

Preparation of Composition for Forming Gold Nanoparticle-Dispersed Film (3)

A composition for forming a gold nanoparticle-dispersed film was prepared by carrying out the same operation as that carried out in Examples 6 and 7, except that the aqueous solution of gold nanoparticles obtained in Comparative Example 2 was used instead of the gold nanoparticle dispersion liquid obtained in Example 1.

The film-forming composition thus obtained was colorless, and aggregates of gold nanoparticles were recognized on the wall surfaces of the reaction vessel. Thus, gold nanoparticles were not sufficiently dispersed.

Example 9

Preparation of Gold Nanoparticle-Dispersed Film (1)

The film-forming composition obtained in Example 7 was poured into a container made of aluminum, and was heated for one hour at 95° C. Thus, a cured film was produced.

The cured film thus obtained was red in color. Furthermore, the gold nanoparticles in the cured film were highly dispersed and were retained in a very stable state. From these results, it was found that aggregation or the like did not occur at the time of curing.

Comparative Example 4

Preparation of Gold Nanoparticle-Dispersed Film (2)

A cured film was produced by carrying out the same operation as that carried out in Example 9, except that the film-forming composition obtained in Comparative Example 3 was used instead of the film-forming composition obtained in Example 7. The cured film thus obtained was colorless and transparent, and a gold nanoparticle-dispersed film was not obtained.

Example 10

Preparation of Gold Nanoparticle-Dispersed Film (3)

The dispersion liquid obtained in Example 6 was poured into a container made of aluminum, and was heated for one hour at 100° C. Thus, a gold nanoparticle-dispersed film was produced.

The dispersed film thus obtained was red in color. Furthermore, in this dispersed film, the gold nanoparticles were highly dispersed and were retained in a very stable state, regardless of the inclusion of a high concentration of gold nanoparticles.

Example 11

Preparation of Gold Nanoparticle-Dispersed Film (4)

The film-forming composition obtained in Example 8 was poured into a Petri dish made of glass, and was heated for one hour at 90° C. Thus, a gold nanoparticle-dispersed film was produced.

The dispersed film thus obtained was red in color. Furthermore, in this dispersed film, the gold nanoparticles were highly dispersed and were retained in a very stable state, regardless of the inclusion of a high concentration of gold nanoparticles.

The invention claimed is:

1. A metal nanoparticle composite, comprising:
(A) a star-shaped polymer comprising a central core and arms bonded to the central core,
wherein the arms comprise a repeating unit represented by formula (1):

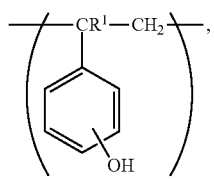

and a repeating unit represented by formula (2):

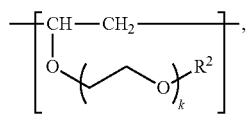

wherein $R^1$ represents a hydrogen atom or an alkyl group having 1 to 4 carbon atoms, $R^2$ represents a methyl group or an ethyl group, and k represents an integer from 1 to 10; and
(B) metal nanoparticles supported thereon, wherein the metal nanoparticle composite comprises from 13 parts to 50 parts by mass of the metal nanoparticles relative to 1 part by mass of the star-shaped polymer.

2. The metal nanoparticle composite according to claim 1, wherein the metal nanoparticles comprise at least one metal element selected from the group consisting of gold, silver, and copper.

3. The metal nanoparticle composite according to claim 1, wherein the arms comprise a polymer chain comprising a repeating unit represented by the formula (1) and a polymer chain comprising a repeating unit represented by the formula (2).

4. The metal nanoparticle composite according to claim 1, wherein the arms comprise a polymer chain comprising a block body of a repeating unit represented by the formula (1) and a repeating unit represented by the formula (2).

5. The metal nanoparticle composite according to claim 1, wherein the star-shaped polymer has a lower limit critical solution temperature in an aqueous medium.

6. A metal nanoparticle dispersion liquid, comprising:
the metal nanoparticle composite according to claim 1, and
an aqueous medium.

7. The metal nanoparticle dispersion liquid according to claim 6, wherein the aqueous medium is at least one selected from the group consisting of water, an alcohol, an aliphatic ketone, an aliphatic polyhydric alcohol, a glycol derivative, and a pyrrolidone.

8. The metal nanoparticle dispersion liquid according to claim 6, further comprising:
at least one water-soluble resin selected from the group consisting of polyvinyl alcohol, a modified polyvinyl alcohol-based resin, polyethylene glycol, polyethylene oxide, polyvinyl pyrrolidone, and a cellulose ether-based resin.

9. A method for producing a metal nanoparticle composite according to claim 1, the method comprising:
(a) contacting the star-shaped polymer with at least one member selected from the group consisting of a metal salt and a metal complex salt in an aqueous medium, to adsorb at least one selected from the group consisting of a metal ion and a metal complex ion to the star-shaped polymer; and
(b) contacting a reducing agent with at least one member selected from the group consisting of a metal ion and a metal complex ion that are adsorbed in said (a) contacting.

10. The method according to claim 9, wherein the at least one member selected from the group consisting of a metal salt and a metal complex salt comprises at least one metal element selected from the group consisting of gold, silver, and copper.

11. The method according to claim 9, wherein the reducing agent comprises at least one member selected from the group consisting of an alkali metal borohydride, a hydrazine compound, citric acid, a citric acid salt, succinic acid, a succinic acid salt, ascorbic acid, and a ascorbic acid salt.

12. The method according to claim 9, wherein the method further comprises:
(c) heating an aqueous medium comprising the metal nanoparticle composite obtained said (b) contacting to a temperature higher than a lower limit critical solution temperature of the star-shaped polymer, separating an aggregate phase comprising the metal nanoparticle composite and a liquid phase comprising the aqueous medium, and collecting the aggregate phase; and
(d) dispersing the aggregate phase from said (c) heating in an aqueous medium that is identical with or different from the aqueous medium used in the bringing (a) at a temperature lower than the lower limit critical solution temperature of the star-shaped polymer
wherein the star-shaped polymer has the lower limit critical solution temperature in the aqueous medium.

13. The method according to claim 9, wherein the aqueous medium comprises at least one member selected from the group consisting of water, an alcohol, an aliphatic ketone, an aliphatic polyvalent alcohol, a glycol derivative, and a pyrrolidone.

14. A composition for forming a metal nanoparticle-dispersed film, the composition comprising:
the metal nanoparticle composite according to claim 1, and
at least one selected from the group consisting of a crosslinkable compound and a film-forming resin.

15. The composition according to claim 14, wherein the film-forming resin comprises at least one selected from the group consisting of a water-soluble resin and an acrylic resin.

16. A metal nanoparticle-dispersed film obtained from the composition according to claim 14.

17. The metal nanoparticle composite according to claim 1, which comprises from 13 parts to 30 parts by mass of the metal nanoparticles relative to 1 part by mass of the star-shaped polymer.

18. The metal nanoparticle composite according to claim 1, which comprises from 13 parts to 20 parts by mass of the metal nanoparticles relative to 1 part by mass of the star-shaped polymer.

19. The metal nanoparticle composite according to claim 1, wherein the metal nanoparticles comprise at least one metal element selected from the group consisting of gold, silver, platinum, copper, ruthenium, rhodium, palladium, osmium, and iridium.

* * * * *